United States Patent [19]
Levitt et al.

[11] Patent Number: 5,058,190
[45] Date of Patent: Oct. 15, 1991

[54] SELECTIVE READOUT OF A DETECTOR ARRAY

[75] Inventors: Hal L. Levitt, Baltimore, Md.; Gordon W. Anderson, Washington, D.C.; Anthony E. Spezio, Laurel, Md.

[73] Assignee: The United States of America as represented by the Secretary of the Navy, Washington, D.C.

[21] Appl. No.: 582,275

[22] Filed: Sep. 14, 1990

[51] Int. Cl.⁵ .............................................. G06K 9/12
[52] U.S. Cl. ......................................... 382/68; 382/27
[58] Field of Search ........................ 382/27, 68, 9–11

[56] References Cited

U.S. PATENT DOCUMENTS

| | | | |
|---|---|---|---|
| 3,967,241 | 6/1976 | Kawa | 382/27 |
| 4,327,354 | 4/1982 | Persoon | 382/27 |
| 4,384,273 | 5/1983 | Ackland et al. | 382/27 |
| 4,395,698 | 7/1983 | Sternberg et al. | 382/27 |
| 4,791,675 | 12/1988 | Deering | 382/27 |
| 4,860,373 | 8/1989 | Hartless et al. | 382/27 |

Primary Examiner—Stephen Brinich
Attorney, Agent, or Firm—Thomas E. McDonnell; Lawrence A. Root

[57] ABSTRACT

An image processing system and method are provided which use a selectively accessed detector array comprised of subarrays. Regions of image activity are located within the detection array through readout of the activity determining elements. Each subarray is evaluated to determine whether any image activity has been detected by the corresponding subarray. Data is only read for the active subarrays. Thus, the activity indicator allows efficient transfer of relevant data from the detector array without requiring previous information. This results in reduced data flow and generally shorter readout cycles. The activity determination can be a non-destructive process so that data contained in the detection array remains available for sensor readout. This eliminates the need to perform one detector exposure cycle to determine activity and a second cycle to read out data from the detector.

13 Claims, 6 Drawing Sheets

SELECTIVE READOUT OF A DETECTOR ARRAY

FIELD OF THE INVENTION

The present invention relates to image signal processing methods and apparatus and, more particularly to an image signal processing method and apparatus that provides rapid data acquisition using activity sensing elements to test subarrays for activity and to queue random access of active subarrays.

BACKGROUND OF THE INVENTION

A typical detector array of an image signal processing system provides spatial image pattern acquisition, conversion, and readout. Most prior art detector arrays simultaneously capture and convert image data at individual elements and sequentially output the array contents. Sequential readout of the entire array limits the frame rate (how often the array can be read out per unit time) that can be achieved. Therefore, applications requiring high frame rates are throughput limited by the readout circuitry. Some prior art detector arrays use parallel output lines or random address architectures to improve array readout speed. Such random access detector arrays provide fast readout of predetermined detector regions. However, the entire detector array must first be scanned in full to locate regions of interest Therefore, the total frame rate is still limited.

High speed operation, parallel output structures, or random access addressing architectures improves performance. By providing higher detector output rates, these approaches achieve fast frame rates and are thus useable in rapidly changing image environments. However, these approaches do not reduce the volume of data to be output from the detector array and, consequently, the time required to read the contents of the array is proportional to the array size, for a given frame access rate. As the size of the detector array increases, a corresponding increase in the output rate (given the same architecture) is required to maintain the same frame access rate. Subsequent processing is also required to remove unwanted data (i.e. data not corresponding to an active image of interest) from the output. Moreover, removal of unwanted data does not increase array readout speed, but rather only reduces the data volume for subsequent processing.

Prior methods for locating objects of interest in the data from random access arrays typically use information obtained from previous full scans of the array to track the object. Data access based on previous information increases readout speed and reduces output data requirements for stationary or slowly changing objects. However, for this technique to be effective, future object positions must be predictable from previously known position information. Previous information is not always available for predictions; for instance, such information is not available if a new frame of data is uncorrelated with previous frames. Uncorrelated data occurs when an object changes location within the detector array at a speed approaching or exceeding the readout cycle rate.

SUMMARY OF THE INVENTION

In accordance with the invention, a detector or sensor array system is provided for detecting a spatial pattern in a physical parameter such as light. The detector array system comprises: a detector array comprising a plurality of subarrays for producing output signals in response to a portion of the spatial pattern; and activity determination means, responsive to the subarrays, for determining whether any of the subarrays has detected a portion of the spatial pattern and for producing an output in accordance with that determination.

In a preferred embodiment, the subarrays each include a plurality of discrete detector elements and the activity determination means determines whether a minimum number of elements within each subarray has detected the spatial pattern. For each subarray of detector elements there is one activity determining element dedicated to providing a single activity indicating output for that subarray.

An important advantage of the invention is that the activity determination means permits efficient transfer of relevant data from the detector array without requiring previous information. This reduces data volume and shortens readout cycles because only the active subarrays need to be read out. Further, because the activity readout is non-destructive, the data contained in the active arrays can be directly read out without the need to perform a separate detector exposure cycle to determine activity.

Other features and advantages of the invention will be apparent from the drawings and detailed description of the preferred embodiment.

DETAILED DESCRIPTION OF THE PREFERRED EMBODIMENT

Figure 1:
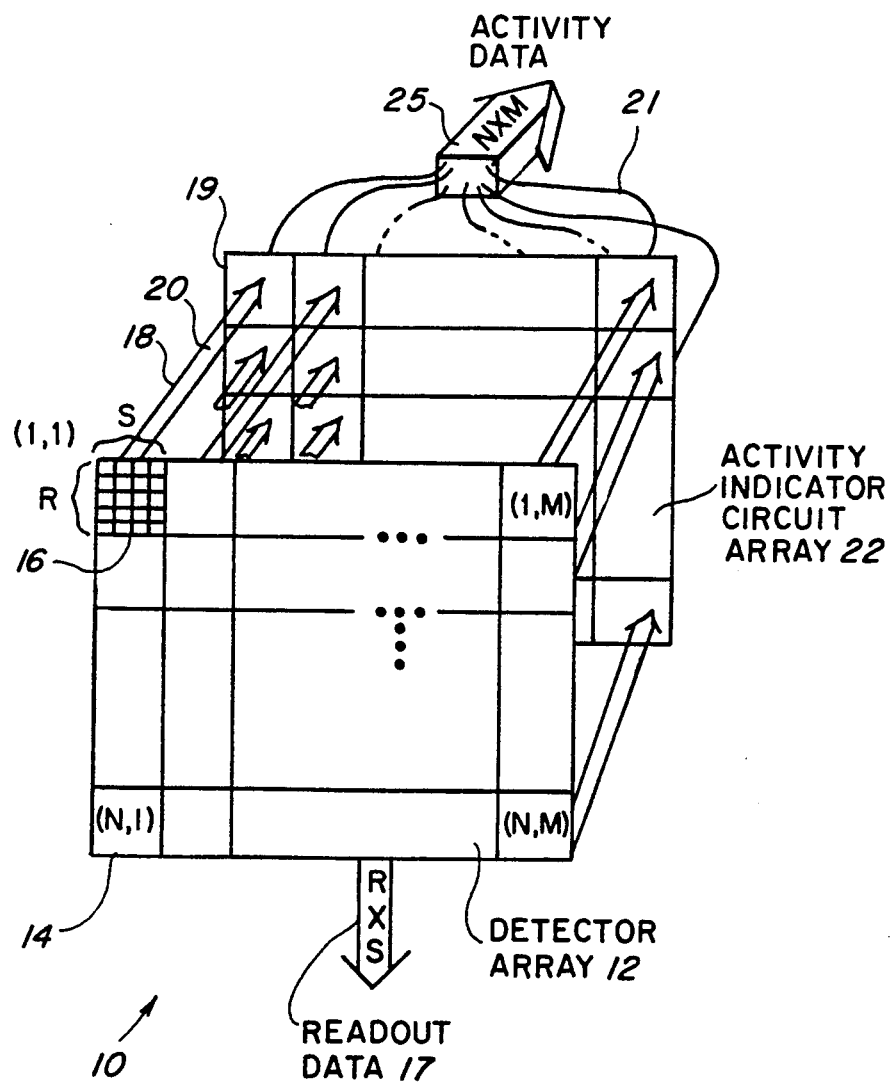
FIG. 1 shows a schematic representation of an area photodetector array constructed in accordance with this invention.

Referring now to the drawings, FIG. 1 shows an area image processor 10 comprising a detector or sensor array 12 having N rows by M columns of subarrays 14 for a total of N×M subarrays. Each subarray 14 further comprises a matrix of R rows by S columns of optically sensitive detector elements 16. Hence, detector array 12 includes a total of (N×R)×(M×S) detector elements 16. An optical imager (not shown) projects light onto detector array 12.

Each subarray 14 is randomly addressable via an address decoding circuit (not shown) with each row-column address uniquely corresponding to one subarray 14. A parallel analog output bus 18 provides output from each of the subarrays 14. Output bus 18 comprises R×S data signal lines 20. Therefore, bus 18 outputs the data from an entire subarray 14 at one time.

Each output bus 18 feeds an activity indicator circuit 19 within an activity indicator circuit array 22 which determines whether activity has occurred in its associated subarray 14. A single output signal is provided by each activity indicator circuit 19 indicating whether any "activity" has occurred within its subarray 14. The information in indicator array 22 is developed concurrently with the information in detector array 12. Output from indicator array 22 is provided through output bus 25 having N×M individual data lines 21.

In use, the contents of indicator array 22 are read out through output bus 25 to determine which subarrays 14 are active. A conventional readout processor 17 reads detector elements 16 within the active subarrays 14 with conventional address decoding and readout circuits (not shown). No data is read from those subarrays 14 which are inactive. Since there are 1/(R×S) fewer indicator circuit elements 19 than detector elements 16, readout of the indicator array 22 is rapid compared with readout of the entire detector array 12. Using the indicator array 22 as a basis to selectively queue access of detector elements 16 reduces the data volume and shortens the readout cycle.

Alternatively, rather than selecting subarrays based on the presence of any activity, activity indicator circuit 19 could apply a threshold condition. Two alternative embodiments of the activity indicator circuit 19 will be provided. The two embodiments correspond to different activity threshold conditions. In each embodiment, the output from an individual indicator circuit 19, as read through output bus 25, is the basis to selectively queue subarrays 14 for data output via readout circuit 17.

Figure 2:
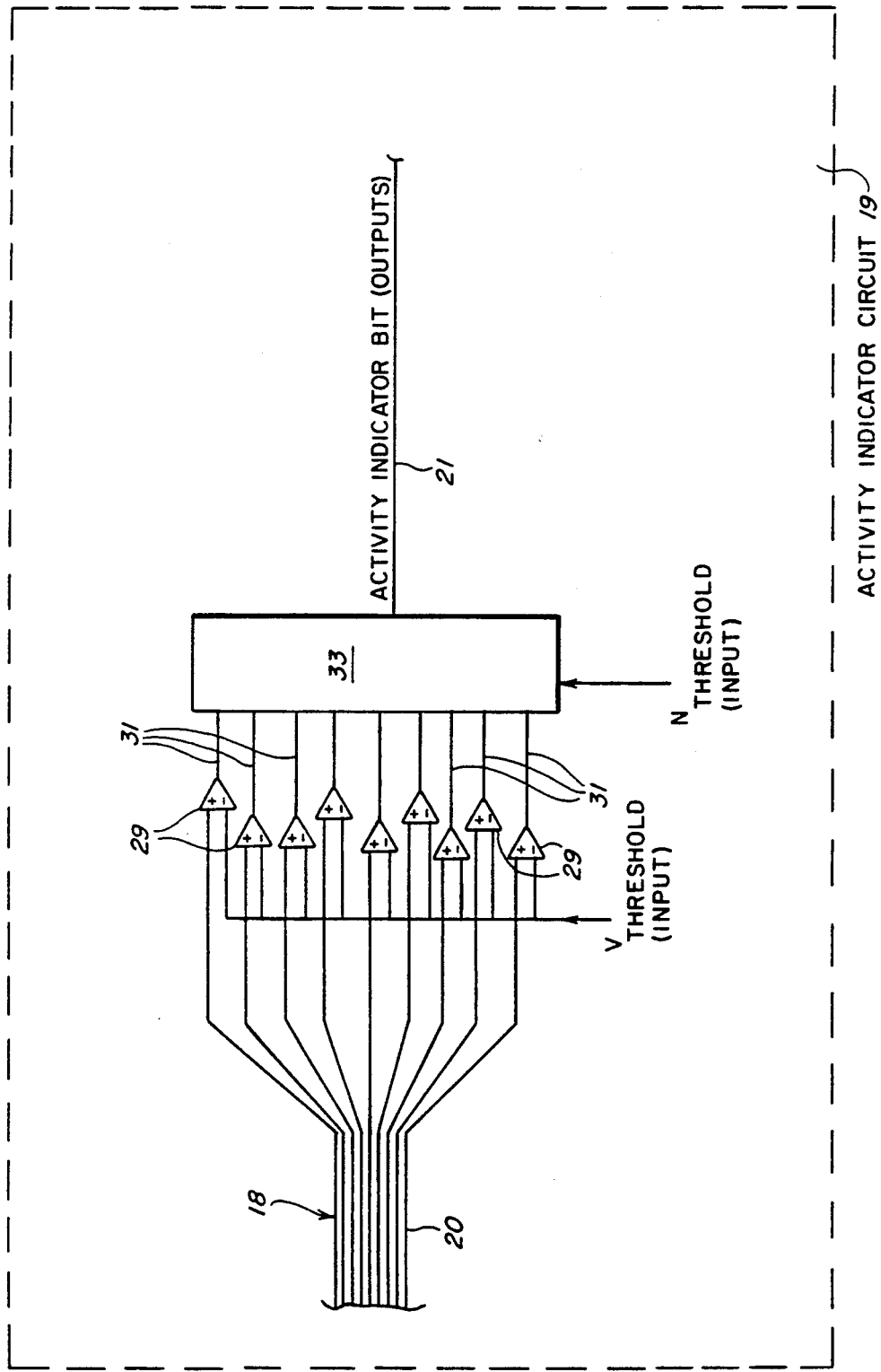
FIG. 2 shows a schematic representation of one embodiment of the activity indicator circuit of the detector of FIG. 1.

FIG. 2 shows the first embodiment for activity indicator circuit 19. In the discussion which follows, $V_{threshold}$ represents the threshold voltage an individual detector element 16 must exceed to be considered active. Additionally, $N_{active}$ denotes the number of elements 16 which are active (that is, which exceed the threshold voltage) within a given subarray 14 while $N_{threshold}$ denotes the minimum number of active elements 16 within subarray 14 required for the activity threshold condition to be met. Whether $N_{threshold}$ is achieved within any subarray 14 is reflected by a binary activity indicator output 21. The threshold level variables $N_{threshold}$ and $V_{threshold}$ are either fixed circuit design parameters or programmed device inputs. In the exemplary embodiment shown in FIG. 2, bus 18 includes nine individual data lines 20 from a subarray 14 of R×S=9 detector elements 16.

Each data line 20 feeds into a comparator 29. The second input of each comparator 29 is set to $V_{threshold}$. If the voltage of detector element 16 is less than $V_{threshold}$, comparator 29 outputs a binary "0" signal level to a corresponding data line 31. If the voltage of detector element 16 is greater than $V_{threshold}$, comparator 29 outputs a binary "1" signal level. Data lines 31 are connected to a logic circuit 33 which also receives $N_{threshold}$ as an input. Logic circuit 33 compares the number of "1" input signals received on data lines 31 (represented by $N_{active}$) to the required number (represented by with $N_{threshold}$). Circuit 33 outputs a binary "1" to data line 21 if $N_{active} \geq N_{threshold}$ or a binary "0" if $N_{active} 21 N_{threshold}$. Thus, for the embodiment of activity indicator circuit 19 shown in FIG. 2, data will be read out from each subarray if, and only if, at least $N_{threshold}$ detector elements of that subarray develop output signals greater than $V_{threshold}$.

Figure 3:
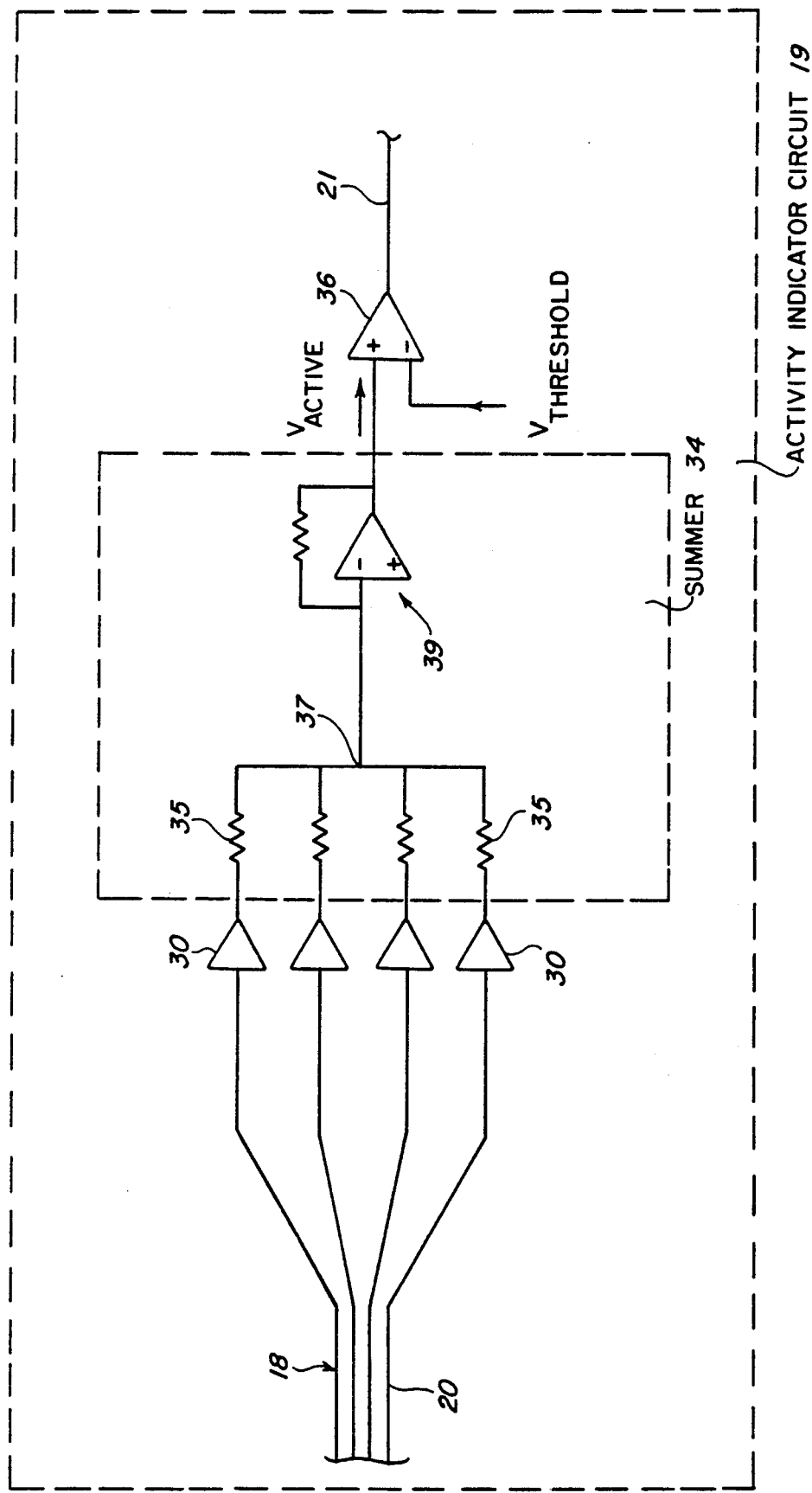
FIG. 3 shows a schematic representation of an alternative embodiment of the activity indicator circuit of FIG. 1.

FIG. 3 shows a second embodiment for activity indicator circuit 19. In the discussion which follows $V_{active}$ represents the summed signal voltage of each active element 16 within subarray 14 and $V_{threshold}$ represents the minimum summed voltage required to satisfy the activity threshold. In the exemplary embodiment of activity indicator circuit 19 shown in FIG. 3, bus 18 includes four data lines 20 from a subarray 14 of R×S=4 detector elements 16. Each data line 20 feeds an individual buffer amplifier 30. Summer 34 sums the analog signal from all buffer amplifiers 30 into the combined analog signal $V_{active}$. Comparator 36 compares the summed $V_{active}$ to the required $V_{threshold}$. Comparator 36 outputs a binary "1" if $V_{active} \geq V_{threshold}$ or a binary "0" if $V_{active} < V_{threshold}$.

Alternative embodiments for activity indicator circuit 19 use different activity threshold criteria. For example, the change in signal levels from the subarray could be used as the criterion by taking the difference between the present signal level and the previous signal level. Alternatively, the criterion could be the rate of change as indicated by the spatial or temporal derivative of the signal level. These alternatives, and the example alternatives, could be implemented with either analog or digital circuitry.

In the above-described embodiments, the non-destructive reading of data from detector array 12 is used to determine the activity within subarrays 14. As a result, readout circuit 17 can read the same signal from individual elements 16 as is used to determine the activity within subarray 14.

Figure 4:
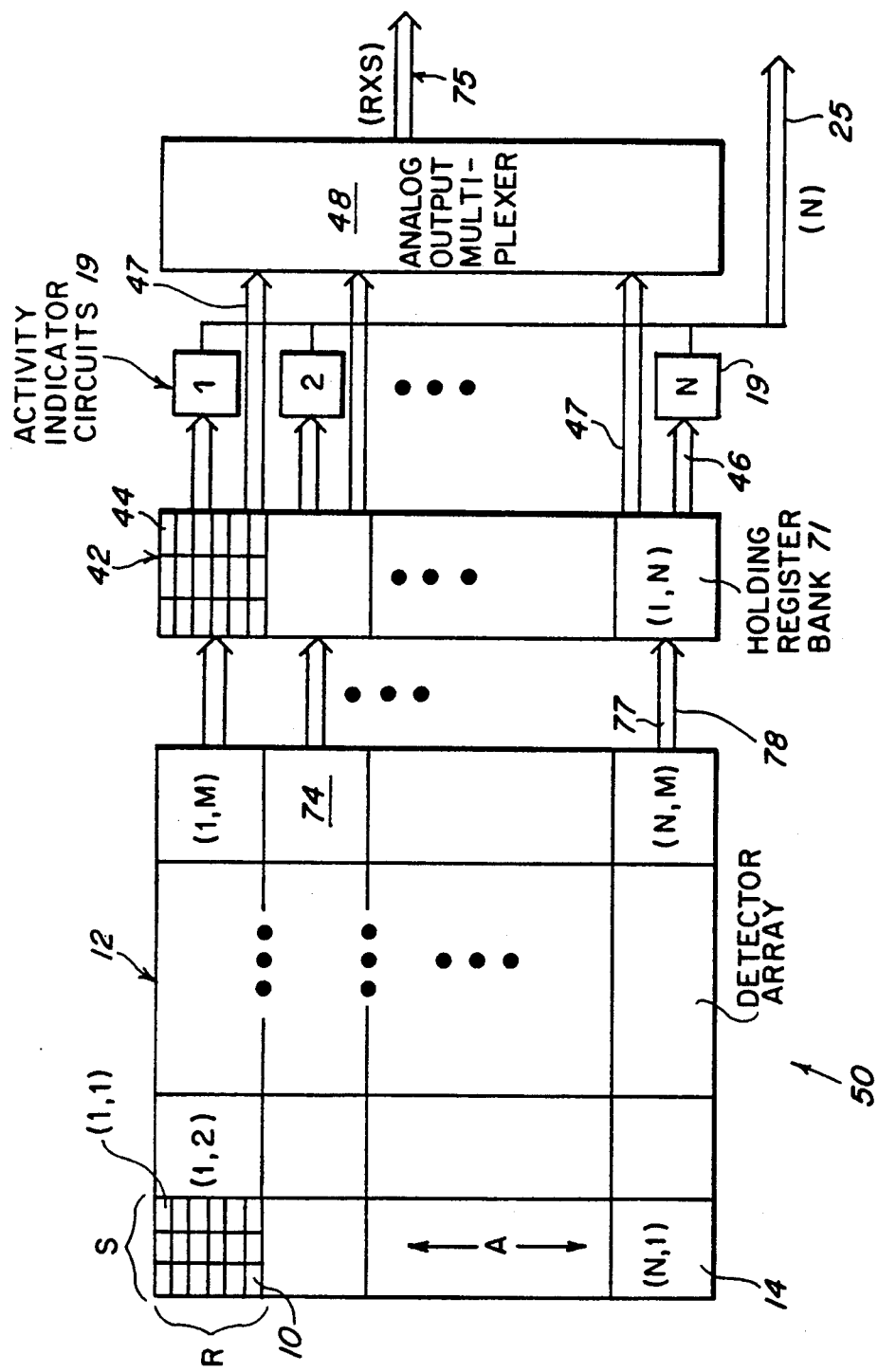
FIG. 4 shows a schematic representation of an alternative embodiment of the area photodetector array constructed in accordance with this invention.

FIG. 4 shows an alternative embodiment of an area photodetector array 50 constructed in accordance with the present invention. The embodiment of FIG. 4 is similar to the embodiment of FIG. 1 except that this embodiment includes a bank 42 of supplemental holding registers that receives the entire contents of a column 74 of subarrays 14 through a plurality of parallel bus data lines 78. Bank 42 includes N×R×S memory registers 44 for storing the contents of each detector element 16 within a column 74 of subarrays 14. Thus, for instance, the entire column along line A in FIG. 4 can be transferred in parallel to bank 42. N activity indicator circuits 19 are provided, one for each subarray 14 in column 74. Each circuit 19 receives input from bank 42 corresponding to one subarray 14 via data lines 46. Each circuit 19 produces a binary signal indicating whether the corresponding subarray (as stored in bank 42) is active. Output from circuit 19 is provided through output bus 25.

Area array photodetector 50 also includes an analog output multiplexer 48 for receiving the R×S contents of a selected subarray 14 from bank 42, and outputting the contents in parallel via output bus 75 having R×S individual data lines.

In use, column 74 of subarrays 14 is transferred in parallel to bank 42. Signals from each subarray 14 are fed through circuits 19 which determine which subarrays are active and which output that information through activity indicator output bus 25. Output bus 25 is queried to determine if bank 42 has any subarrays 14 that are active and, if so, multiplexer 48 is used to read out the R×S contents of each active subarray 14 through data lines 47. The sequence is then repeated for the next column 74 of subarrays 14 in detector 12. Holding register bank 42 permits activity circuits 19 to be remotely located from detector array 12. Bank 42 also significantly reduces the number of activity indicator elements 19 required. An external processor (not shown) sequentially reads subarray holding register elements 44 through (R×S) data lines 75. The row portion of the address identifies which subarray holding register element 71 is to be read out.

Figure 5:
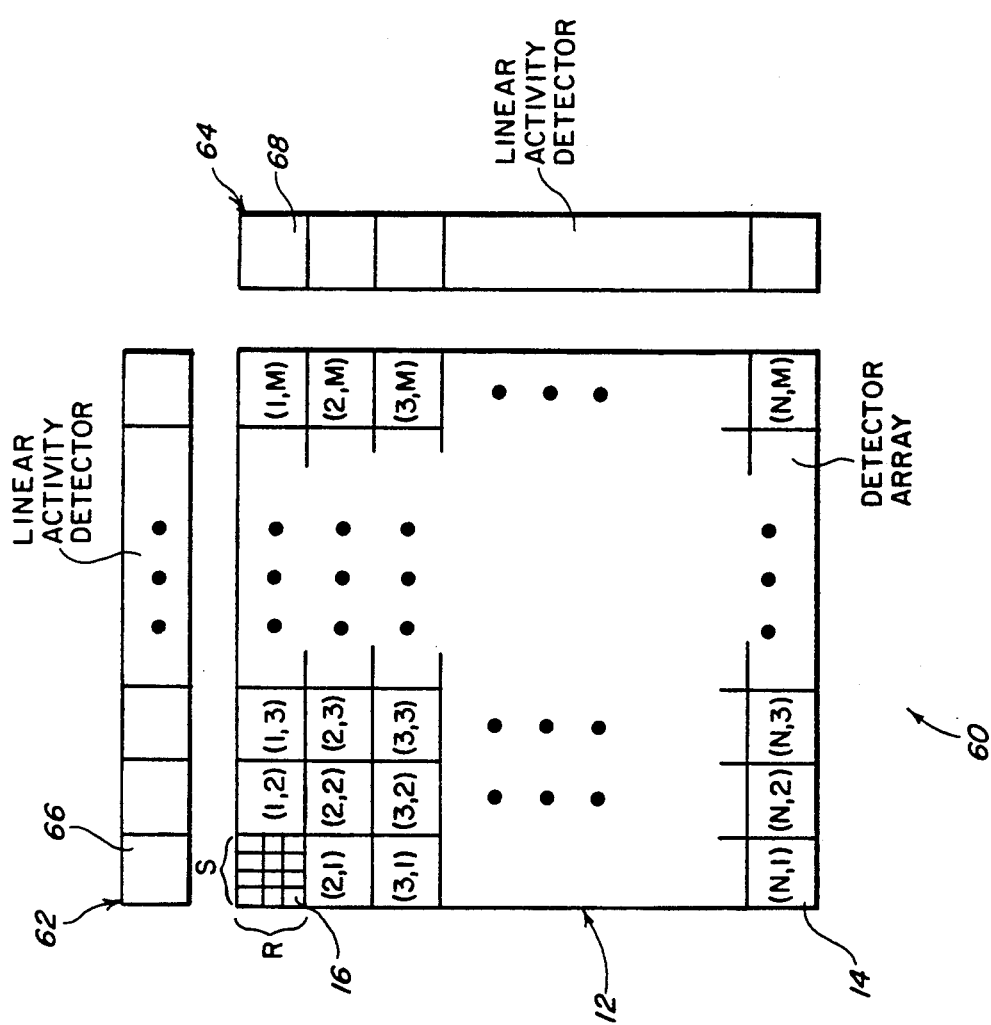
FIG. 5 shows a schematic representation of an alternative embodiment of the area photodetector array constructed in accordance with this invention.

FIG. 5 shows another embodiment of an area photodetector array 60 constructed in accordance with the present invention. This embodiment is similar to the embodiment of FIG. 1 except that two linear activity indicators 62 and 64 are used to determine whether there is activity within subarrays 14. Activity indicators 62 and 64 comprise linear photodetector arrays positioned parallel to the two axes of array 12. Activity arrays 62 and 64 are located in proximity to area array 12 and the individual elements (such as 66 or 68) of the respective activity array 62 and 64 are precisely aligned with the row or column boundaries of area array 12. The number of elements 66 or 68 in the indicators 62 or 64 equals the number of columns or rows of subarrays 14, M or N respectively, along the respective axis of area array 12. Thus, there are fewer activity indicator elements 66 and 68 than subarrays 14: there are only N+M rather than N×M indicators. The optical imager for the embodiment of FIGS. 1, 4 (not shown) which projects an image onto detector array 12 must be modified for the embodiment of FIG. 5. The incoming image must be split into three beams. One beam will be projected onto detector array 12 as is done in the embodiments of FIGS. 1, 4. A second beam must be focused along linear activity detector 62 such that the image intensity associated with the first beam that is projected onto array column 1 is focused (optically summed) onto the first activity detector element of detector 62. There is a similar focusing of the image associated with each remaining column onto associated elements of linear activity detector 62. Similarly, the third beam is focused onto linear activity detector 64 in a pattern that associates the activity cells to the rows. Therefore, the intensity detected by a single element 66 or 68 is proportional to the sum of the values detected by the individual elements 16 along one row or column of subarrays. This is represented by the following equations:

$$\text{Indicator} = b\,\Sigma_{i=1\ldots N}\,\text{Subarray}\,(x,i)$$

$$\text{Element}_{62x} = b\,\Sigma_{i=1\ldots N}\,[\text{Sum}_{r,s}\text{subarray element}(r,s)]$$

$$= b\,\sum_{i=1}^{N}\,\text{Subarray}(x,i)\,\sum_{r=1}^{R}\,\sum_{s=1}^{S}\,\text{sensorelement}(r,s);$$

$$\text{Indicator} = c\,\Sigma_{i=1\ldots M}\,\text{Subarray}\,(i,y)$$

$$\text{Element}_{64y} = c\,\Sigma_{i=1\ldots M}\,[\text{Sum}_{(r,s)}\text{subarray element}(r,s)]$$

$$= c\,\sum_{i=1}^{N}\,\text{Subarray}(i,y)\,\sum_{r=1}^{R}\,\sum_{s=1}^{S}\,\text{sensorelement}(r,s);$$

where b and c are proportionality constants. In use, activity arrays 62 and 64 are queried to provide indices which identify the active regions of the area array 12.

Figure 6:
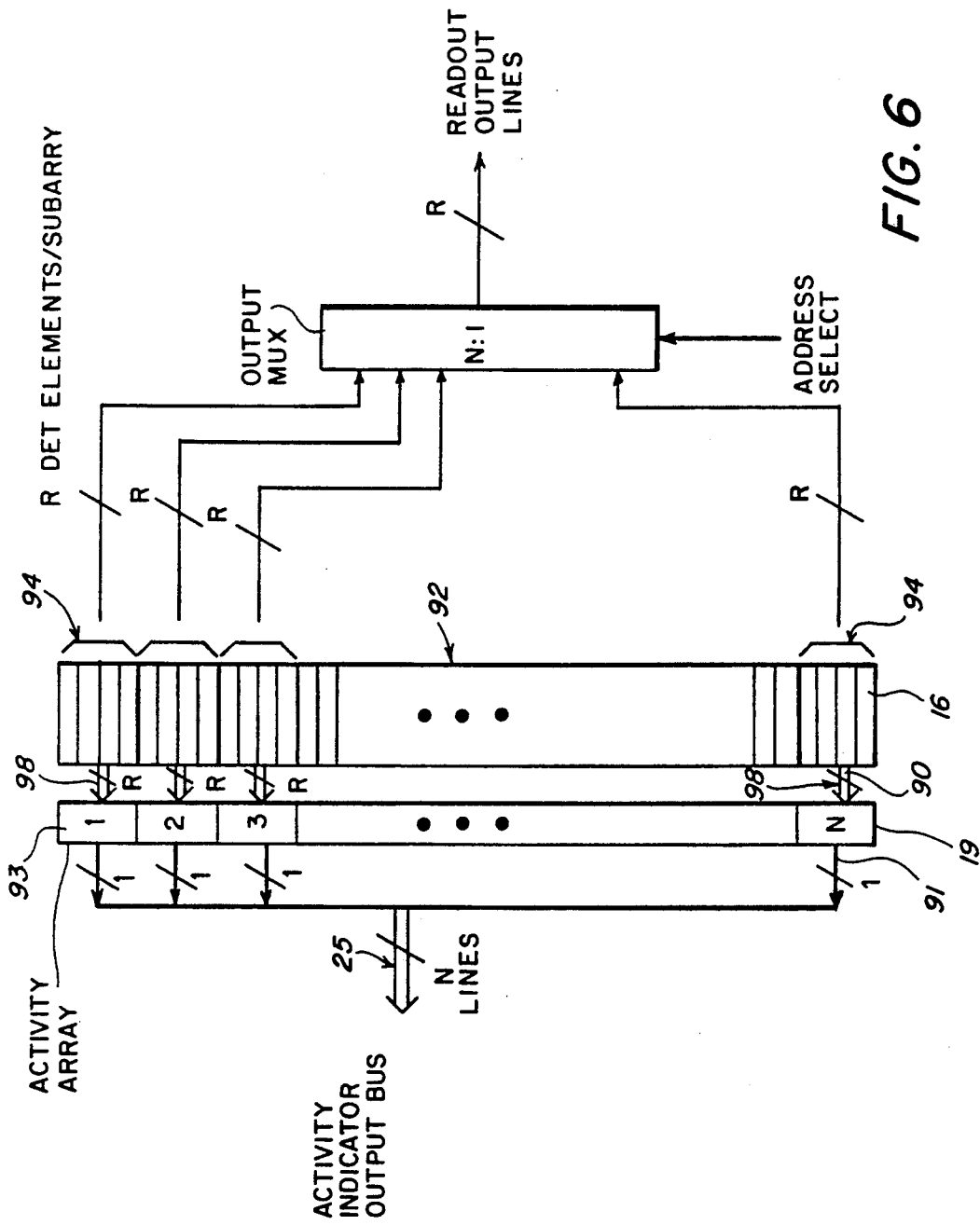
FIG. 6 shows a schematic representation of a linear photodetector array constructed in accordance with this invention.

FIG. 6 shows a linear embodiment of the present invention. Linear detector array 92 is similar to a single column of detector elements 16 from the embodiment of FIG. 1. Linear detector array 92 comprises N randomly addressable subarrays 94 each comprising R detector elements 16. Thus, array 92 will have N×R elements 16. Output of an entire set of N subarrays 94 is provided through N parallel analog buses 98 each having R data signal lines 90.

Each of the N activity indicator circuits 19 interprets activity in all R linear array detection elements 16 in corresponding subarray 94. Outputs 91 from individual activity indicator circuits 19 are combined onto a separate activity output bus 25 accessible to an external processor.

As will be apparent, the present invention has broad potential application. The invention can be applied to any array of information which might, for example, be data read from detectors such as acoustic, heat, X-ray, or radio detectors. The present invention can be applied advantageously wherever a data array is used to represent a spatial pattern containing localized sub-patterns. Also, the criterion used for each activity detector element can be varied according to the application. However, in each case, an activity detection element detects activity within a subarray and provides a single signal representing the subarray's activity.

Although the embodiments were described in terms of random access, non-sequential, addressing schemes; sequential, non-random, access can also be used. For example, some currently used area photodetector arrays output their contents sequentially (non-random access), but provide means to rapidly sequence through portions of the array without providing output, while outputting the entire data contents of desired regions. The activity detection scheme of the present invention can be advantageously exploited in such a photodetector array.

As shown in the preceding paragraph, performance features such as the parallel outputs and subarray addressing discussed in the example embodiments above are not necessary for the present invention. Also, the subarrays within area arrays need not be rectangular: their size and shape can be tailored to the application.

Thus, although the invention has been described with respect to exemplary embodiments, it will be understood by those skilled in the art that variations and modifications can be effected in these exemplary embodiments without departing from the scope and spirit of the invention.

We claim:

1. A detector system comprising:
   a detector array for detecting a spatial pattern, said detector array comprising a plurality of subarrays each having a plurality of detector elements;
   activity determination means connected to said detector array for determining whether any of said subarrays have detected a portion of said spatial pattern; and
   a data readout means, responsive to said activity determination means, for selectively reading out data from said subarrays determined to have detected a portion of said spatial pattern.

2. The detector system of claim 1, wherein said data readout means reads data from the same detection cycle upon which said activity determination was based.

3. The detector system of claim 1, wherein said activity determination means determines whether a minimum number of said elements within said subarrays has detected a portion of said spatial pattern.

4. The detector system of claim 1, wherein said activity determination means further comprises:
   a counting means to count the number of active detector elements which have detected a portion of said spatial pattern; and
   a comparison means to compare said number of active detector elements with a predetermined minimum number of active detector elements; and wherein said subarray is determined to be active if said number of active detector elements exceeds said predetermined minimum number.

5. The detector system of claim 4, wherein said activity determination means further comprises:
   a comparison means for comparing the magnitude of the signals from each of said detector elements in s id subarray with a predetermined threshold magnitude; and
   wherein said detector element is determined to be active if said magnitude exceeds said threshold magnitude.

6. The detector system of claim 1, wherein said activity determination means further comprises:
   a summing means to sum the magnitude of the signals from each said detector element in said subarray;
   a comparison means for comparing said summed magnitude with a predetermined threshold magnitude; and
   wherein said subarray is determined to be active if said summed magnitude exceeds said threshold magnitude.

7. The detector system of claim 1, wherein said detector array further comprises:
   a plurality of holding register elements;
   a register connection means to connect each register to at least one of said detector elements; and
   activity connection means to connect said activity determination means to said holding register elements.

8. The detector system of claim 1, wherein said detector array further comprises a rectangular matrix array having a plurality of rows and columns of said subarrays.

9. The detector system of claim 8, wherein said activity determination means further comprises:
   a first linear detector array having a plurality of elements each corresponding to a row of said detector array, for producing a signal responsive to the sum of the output signals of said row of said subarrays.

10. The detector system of claim 9, wherein said activity determination means further comprises:
    a second linear detector array having a plurality of elements each corresponding to a column of said detector array, wherein said linear detector element produces a signal response to the sum of the output signals of said column of said subarrays.

11. The detector system of claim 1, wherein said detector array comprises a photodetector array.

12. The detector system of claim 1, wherein said detector array comprises a linear array of discrete detector elements.

13. A method for detecting spatial patterns, said method comprising the following steps:
    providing a detector array including a plurality of subarrays comprising a plurality of array elements;
    imaging said spatial pattern on said detector array;
    determining whether any of said subarrays have detected a portion of said spatial pattern; and
    directly reading out the array elements of the subarrays which have detected a portion of said spatial pattern.

* * * * *